(12) United States Patent
Kawamura

(10) Patent No.: US 7,009,778 B2
(45) Date of Patent: Mar. 7, 2006

(54) IMAGING OPTICAL SYSTEM, IMAGE DISPLAY APPARATUS AND IMAGING OPTICAL APPARATUS

(75) Inventor: Atsushi Kawamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 48 days.

(21) Appl. No.: 10/659,342

(22) Filed: Sep. 11, 2003

(65) Prior Publication Data
US 2004/0125461 A1   Jul. 1, 2004

(30) Foreign Application Priority Data
Sep. 20, 2002  (JP) ............................. 2002/274724

(51) Int. Cl.
G02B 13/08 (2006.01)
G02B 26/08 (2006.01)
G02B 13/18 (2006.01)

(52) U.S. Cl. .................. 359/668; 359/207; 359/711

(58) Field of Classification Search ................ 359/237, 359/207, 668–671, 710–718, 196–226, 648; 347/206; 382/112
See application file for complete search history.

(56) References Cited

U.S. PATENT DOCUMENTS

| | | | |
|---|---|---|---|
| 3,977,761 A | 8/1976 | Kawazu et al. |
| 4,059,345 A | 11/1977 | Kawamura et al. |
| 4,095,888 A | 6/1978 | Kawazu et al. |
| 4,124,882 A | 11/1978 | Kawamura et al. |
| 4,147,412 A | 4/1979 | Kawamura et al. |
| 4,277,128 A | 7/1981 | Kawamura |
| 4,372,654 A | 2/1983 | Fujioka et al. |
| 4,527,867 A | 7/1985 | Fujioka et al. |
| 4,576,444 A | 3/1986 | Kawamura |
| 4,653,873 A | 3/1987 | Kawamura |
| 4,673,259 A | 6/1987 | Kawamura |
| 5,508,794 A | 4/1996 | Ikesue et al. |
| 5,652,611 A * | 7/1997 | Nakashima et al. ........ 347/206 |
| 5,687,401 A | 11/1997 | Kawamura et al. |
| 5,760,970 A | 6/1998 | Kawamura |
| 5,760,973 A | 6/1998 | Kawamura |

(Continued)

FOREIGN PATENT DOCUMENTS

JP    2002/214550    7/2002

OTHER PUBLICATIONS

R. W. Corrigan, et al., Society for Information Display Symposium, http://www.siliconlight.com/htmlpgs/glvtech-frames/givmainframeset.html, pp. 1-4, "Calibration of a Scanned Linear Grating Light Valve™ Projection System", May 18, 1999.

(Continued)

Primary Examiner—Georgia Epps
Assistant Examiner—Jack Dinh
(74) Attorney, Agent, or Firm—Oblon, Spivak, McClelland, Maier & Neustadt, P.C.

(57) ABSTRACT

An imaging optical system images a one-dimensional image on an image surface by regarding as an object a light modulator element which has light modulator parts arranged one-dimensionally in a first direction, and regarding a bundle of rays from the light modulator element as an object light. The imaging optical system includes at least two anamorphic surfaces each having radii of curvature which are different on an object surface in the first direction and a second direction which is perpendicular to the first direction, so that imaging surfaces in the first and second directions match.

13 Claims, 8 Drawing Sheets

U.S. PATENT DOCUMENTS

| | | | |
|---|---|---|---|
| 6,072,636 A * | 6/2000 | Sato | 359/668 |
| 6,178,254 B1 * | 1/2001 | Rappette et al. | 382/112 |
| 6,185,026 B1 | 2/2001 | Hayashi et al. | |
| 6,198,562 B1 | 3/2001 | Hayashi et al. | |
| 6,317,246 B1 | 11/2001 | Hayashi et al. | |
| 6,496,293 B1 | 12/2002 | Kawamura | |

OTHER PUBLICATIONS

R. W. CORRIGAN, et al., Society for Information Display Symposium, http://siliconlight.com/htmipgs/glvtechframes/givamainframeset.html, pp. 1-4, "CALIBRATION OF A SCANNED LINEAR LIGHT VALVE-198 PROJECTION SYSTEM", May 18, 1999.

* cited by examiner

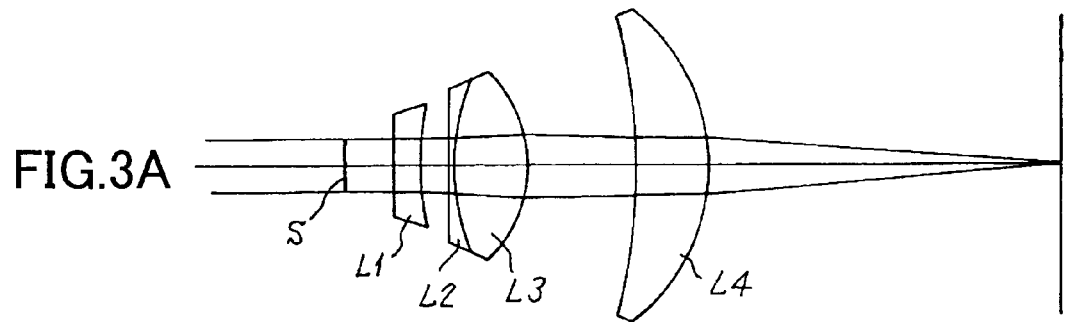
FIG.3A
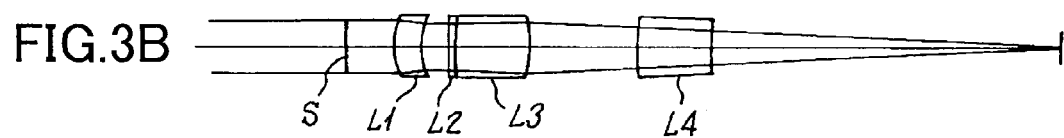
FIG.3B
FIG.4A
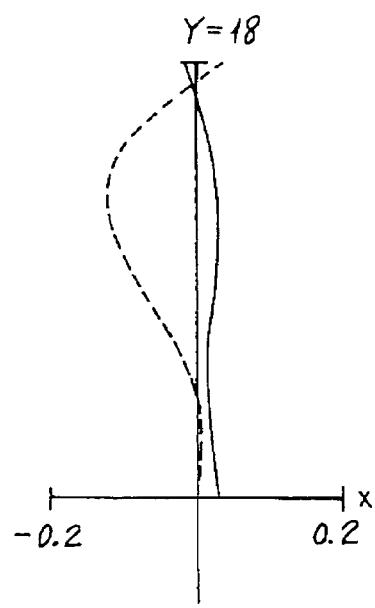
CURVATURE OF FIELD
FIG.4B
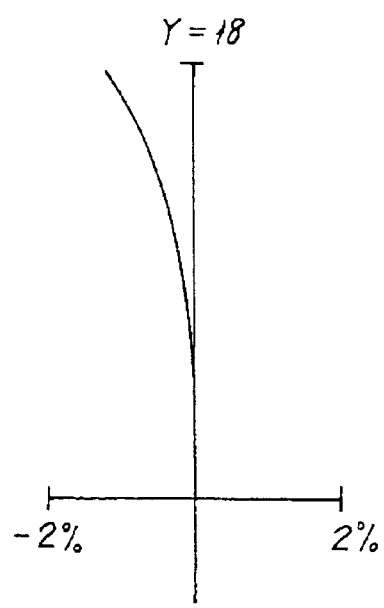
DISTORTION

FIG.10

| i | DESCRIPTION OF SURFACE | Rv | Rh | d | Nd |
|---|---|---|---|---|---|
| 1 | STOPPER | 0.0 | 0.0 | 5.38 | 1.0 |
| 2 | XZ NON-ARCUATE SURFACE | 105.08 | 8.171 | 3.12 | 1.53 |
| 3 | WT SURFACE | 28.28 | 6.62 | 3. | 1.0 |
| 4 | SPHERICAL SURFACE | 502.78 | 502.78 | 0.7 | 1.83511 |
| 5 | SPHERICAL SURFACE | 22.47 | 22.47 | 8.47 | 1.48749 |
| 6 | SPHERICAL SURFACE | −14.74 | −14.74 | 11.83 | 1.0 |
| 7 | WT SURFACE | −67.45 | 29.20 | 8.3 | 1.53046 |
| 8 | XZ NON-ARCUATE SURFACE | −23.28 | 25.58 | 30.1 | 1.0 |
| 9 | IMAGE SURFACE (SURFACE ARRANGED WITH MODULATOR PARTS) | | | | 1.0 |

FIG.11

| SURFACE COEFFICIENT | | 2ND ORDER | 4TH ORDER | 6TH ORDER | 8TH ORDER | 10TH ORDER |
|---|---|---|---|---|---|---|
| i | | | | | | |
| 2 | a | -1.22E-03 | -5.88E-05 | -7.72E-07 | -9.58E-08 | 2.20E-09 |
|   | b | -3.36E-05 | -5.31E-05 | 4.69E-06 | -1.13E-07 | |
|   | d | 3.82E-06 | 1.21E-05 | -1.08E-06 | 2.76E-08 | |
|   | e | | -1.46E-06 | 1.30E-07 | -3.29E-0 | |
| 3 | a | -1.65E-03 | -4.64E-06 | -7.32E-07 | -2.58E-08 | 4.08E-10 |
|   | b | | -8.52E-08 | 1.43E-07 | -1.61E-10 | |
| 8 | a | | -8.02E-06 | 6.12E-08 | -1.57E-08 | 4.08E-10 |
|   | b | -1.25E-04 | -2.08E-07 | 7.22E-10 | 6.58E-13 | |
| 9 | a | -1.17E-04 | -7.30E-06 | 2.20E-08 | -2.90E-11 | -2.10E-14 |
|   | b | -5.69E-06 | -2.09E-07 | -2.98E-10 | 1.87E-12 | |
|   | d | 2.50E-06 | 1.01E-07 | -3.60E-10 | 3.65E-13 | |
|   | e | | -3.92E-08 | 1.62E-10 | -2.10E-13 | |

FIG.12

| SURFACE NO. i | R | D | Nd | νd |
|---|---|---|---|---|
| 1 | 40.8 | 11.6 | 1.58913 | 61.3 |
| 2 | -54.0 | 21.1 | 1.0 | |
| 3 | 33.1 | 8.6 | 1.6968 | 55.5 |
| 4 | -44.5 | 0.2 | 1.0 | |
| 5 | -66.5 | 0.7 | 1.83634 | 33.7 |
| 6 | 32.3 | 0.6 | 1.0 | |
| 7 | 15.47 | 5.4 | 1.53046 | 55.8 |
| 8 | 20.6 | 4.0 | 1.0 | |
| 9 | 30.4 | 3.8 | 1.53046 | 55.8 |
| 10 | -731.0 | | 1.0 | |

IMAGING OPTICAL SYSTEM, IMAGE DISPLAY APPARATUS AND IMAGING OPTICAL APPARATUS

BACKGROUND OF THE INVENTION

This application claims the benefit of a Japanese Patent Application No. 2002-274724 filed Sep. 20, 2002, in the Japanese Patent Office, the disclosure of which is hereby incorporated by reference.

1. Field of the Invention

The present invention generally relates to, and more particularly to imaging optical systems, image display apparatuses and imaging optical apparatuses, and more particularly to an imaging optical system for imaging a bundle of rays from a light modulator element, an image display apparatus which uses such an imaging optical system, and an imaging optical apparatus which uses such an imaging optical system.

The present invention is applicable to scanning optical systems, projecting apparatuses such as liquid crystal projectors and Digital Micro-Mirror Device (DMD, registered trademark) projectors, on-vehicle navigators, various display apparatuses, imaging optical systems for Light Emitting Diodes Array (LEDA) printers, and the like.

2. Description of the Related Art

Conventionally, a liquid crystal projector or the like is used as an image display apparatus. The liquid crystal projector displays a two-dimensional image which is displayed on a liquid crystal panel or the like, by projecting and imaging the two-dimensional image on a screen via a projection lens. When displaying a color image by the liquid crystal projector, images of red (R), green (G) and blue (B) components are displayed on three corresponding liquid crystal panels, and the three liquid crystal panels are illuminated by illumination lights of the corresponding colors, so as to obtain image lights which are spatially modulated depending on the images. The image lights of the corresponding colors are combined, and then projected and imaged on the screen via the projection lens, so as to display the color image.

In the image display apparatus described above, the image which is to be displayed is displayed two-dimensionally on the liquid crystal panel or the like. For this reason, a two-dimensional element, such as the liquid crystal panel, is required as a light modulator element for displaying the image. However, it is difficult to reduce the size of such a light modulator element, and consequently, it is difficult to reduce the size of the image display apparatus which employs such a light modulator element.

Recently, another light modulator element has been proposed, which may replace the liquid crystal panel or the like. This light modulator element is made up of extremely small light modulator parts which are arranged one-dimensionally. Hence, an image display apparatus has been proposed, which images a one-dimensional image on a display surface by use of this light modulator element, and deflects and scans the one-dimensional image at a high speed in a direction perpendicular to a longitudinal direction of the one-dimensional image, so as to display a projected image. This image display apparatus is proposed in R. W. Corrigan et al., "Calibration of a Scanned Linear Grating Light Valve™ Projection System", Presented at Society for Information Display Symposium, May 18, 1999 San Jose, Calif. (http://www.siliconlight.com/htmlpgs/glvtechframes/glv-mainframeset.html).

On the other hand, a Japanese Laid-Open Patent Application No. 2002-214550 proposes achieving modulation by deforming a reflection layer to change a direction of reflected light by use of the light modulator element which is made up of extremely small light modulator parts which are arranged one-dimensionally.

The light modulator element which is made up of extremely small light modulator parts which are arranged one-dimensionally has only been developed recently, and there are demands to realize an imaging optical system suited for imaging light from this light modulator element on a display surface. There are also demands to realize an image display apparatus and an imaging optical apparatus which use the imaging optical system and the light modulator element, and are compact and capable of displaying a satisfactory image and particularly capable of displaying a satisfactory color image.

SUMMARY OF THE INVENTION

Accordingly, it is a general object of the present invention to provide a novel and useful imaging optical system, image display apparatus and imaging optical apparatus, in which the above described demands are satisfied.

Another and more specific object of the present invention is to provide an imaging optical system, an image display apparatus and an imaging optical apparatus, which are suited for imaging on a display surface light from a light modulator element which is made up of extremely small light modulator parts which are arranged one-dimensionally, so that a satisfactory image, including a satisfactory color image, can be displayed using a compact structure.

Still another object of the present invention is to provide an imaging optical system for imaging a one-dimensional image on an image surface by regarding as an object a light modulator element which has light modulator parts arranged one-dimensionally in a first direction, and regarding a bundle of rays from the light modulator element as an object light, comprising at least two anamorphic surfaces each having radii of curvature which are different on an object surface in the first direction and a second direction which is perpendicular to the first direction, so that imaging surfaces in the first and second directions match. According to the imaging optical system of the present invention, it is possible to image on the display surface the light from the light modulator element which is made up of the light modulator parts which are arranged one-dimensionally, so that a satisfactory image, including a satisfactory color image, can be displayed using a compact structure.

A further object of the present invention is to provide an image display apparatus comprising a light modulator element which has light modulator parts arranged one-dimensionally in a first direction; an imaging optical system to image a one-dimensional image on an image surface by regarding the light modulator element as an object and regarding a bundle of rays from the light modulator element as an object light, the imaging optical system including at least two anamorphic surfaces each having radii of curvature which are different on an object surface in the first direction and a second direction which is perpendicular to the first direction, so that imaging surfaces in the first and second directions match; and a display section to display an image on a display surface by imaging the one-dimensional image on the display surface via the imaging optical system and relatively scanning the one-dimensional image and the display surface in a direction perpendicular to a longitudinal direction of the one-dimensional image. According to the image display apparatus of the present invention, it is possible to image on the display surface the light from the light modulator element which is made up of the light modulator parts which are arranged one-dimensionally, so that a satisfactory image, including a satisfactory color image, can be displayed using a compact structure.

Another object of the present invention is to provide an imaging optical apparatus comprising a light modulator element comprising a first modulator element having light modulator parts with spectral characteristics for red (R) color and arranged one-dimensionally in a first direction, a second modulator element having light modulator parts with spectral characteristics for green (G) color and arranged one-dimensionally in the first direction, and a third modulator element having light modulator parts with spectral characteristics for blue (B) color and arranged one-dimensionally in the first direction, the first, second and third modulator elements being arranged parallel to each other so that each of the first, second and third modulator elements is adjacent to at least one of the first, second and third modulator elements; and an imaging optical system to image lights from the first, second and third modulator elements of the light modulator element one-dimensionally on a common display surface, a length of an imaging optical path for at least one of the colors being different from those of imaging optical paths of the other two colors, so as to correct differences in magnifications in a direction corresponding to the first direction caused by color aberration. According to the imaging optical apparatus of the present invention, it is possible to image on the display surface the light from the light modulator element which is made up of the light modulator parts which are arranged one-dimensionally, so that a satisfactory image, including a satisfactory color image, can be displayed using a compact structure.

Still another object of the present invention is to provide an image display apparatus comprising a light modulator element comprising a first modulator element having light modulator parts with spectral characteristics for red (R) color and arranged one-dimensionally in a first direction, a second modulator element having light modulator parts with spectral characteristics for green (G) color and arranged one-dimensionally in the first direction, and a third modulator element having light modulator parts with spectral characteristics for blue (B) color and arranged one-dimensionally in the first direction, the first, second and third modulator elements being arranged parallel to each other so that each of the first, second and third modulator elements is adjacent to at least one of the first, second and third modulator elements; an imaging optical system to image lights from the first, second and third modulator elements of the light modulator element one-dimensionally on an image surface; and a display section to display an image on a display surface by imaging the one-dimensional image on the display surface via the imaging optical system and relatively scanning the one-dimensional image and the display surface in a direction perpendicular to a longitudinal direction of the one-dimensional image, a length of an imaging optical path for at least one of the colors being different from those of imaging optical paths of the other two colors, so as to correct differences in magnifications in a direction corresponding to the first direction caused by color aberration. According to the image display apparatus of the present invention, it is possible to image on the display surface the light from the light modulator element which is made up of the light modulator parts which are arranged one-dimensionally, so that a satisfactory image, including a satisfactory color image, can be displayed using a compact structure.

Other objects and further features of the present invention will be apparent from the following detailed description when read in conjunction with the accompanying drawings.

BRIEF DESCRIPTION OF THE DRAWINGS

FIGS. 3A and 3B are diagrams for explaining a first embodiment of an imaging optical system according to the present invention which may be used in FIGS. 1 and 2;

FIGS. 4A and 4B are diagrams for explaining aberration of the first embodiment of the imaging optical system;

FIGS. 10 and 11 are diagrams showing various parameters related to the surfaces of the imaging optical system shown in FIGS. 3A and 3B; and FIG. 12 is a diagram showing various parameters related to surfaces of the imaging optical system shown in FIG. 7.

DESCRIPTION OF THE PREFERRED EMBODIMENTS

Figure 1:
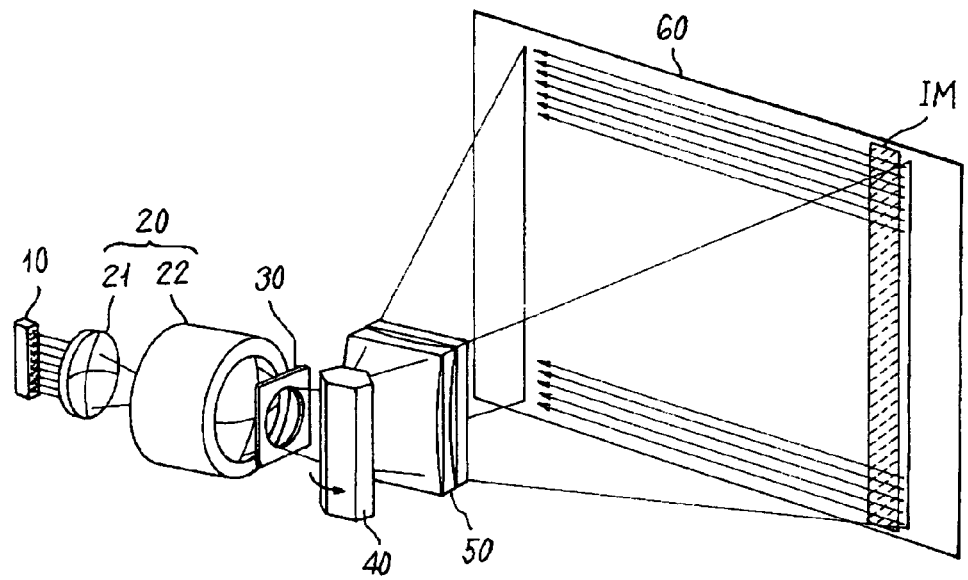
FIG. 1 is a diagram for explaining a first embodiment of an image display apparatus according to the present invention.

FIG. 1 is a diagram for explaining a first embodiment of an image display apparatus according to the present invention. The image display apparatus shown in FIG. 1 employs a light modulator element 10 having a one-dimensional arrangement.

A bundle of rays emitted from the light modulator element 10 is imaged by an imaging optical system 20 and deflected by a deflecting section (deflecting means) 40, so as to image a one-dimensional image IM on a planar display surface 60 and scan in a direction perpendicular to a longitudinal direction of the one-dimensional image IM. An image surface of the imaged bundle of rays deflected and scanned by the deflecting section 40 is made to substantially match the display surface 60 by a curvature of field correcting optical system 50 which is arranged between the deflecting section 40 and the display surface 60.

The light modulator element 10 is a self-emitting type, and includes extremely small light modulator parts which are arranged one-dimensionally, that is, arranged linearly. The linear arrangement of the light modulator parts may be in one column or in a plurality of columns, as long as the light modulator parts are arranged linearly as a whole. Each light modulator part (pixel) has a size of 20 $\mu$m in a vertical direction (up-and-down direction in FIG. 1) V, and 30 $\mu$m in a horizontal direction H. The light modulator parts for red (R) (hereinafter simply referred to as red modulator parts), the light modulator parts for green (G) (hereinafter simply referred to as green modulator parts) and the light modulator parts for blue (B) (hereinafter simply referred to as blue modulator parts) are respectively arranged linearly in the vertical direction V, so that the linearly arranged red (R), green (G) and blue (B) modulator parts are parallel to each other and the corresponding red (R), green (G) and blue (B) modulator parts are arranged at appropriate intervals in the horizontal direction H. Each of the red (R), green (G) and blue (B) modulator parts have a directivity of light emission perpendicular to the vertical direction V.

In the following description, the horizontal direction H refers to the direction which is perpendicular to the vertical direction V in which the light modulator parts of the light modulator element 10 are arranged, on the surface (object surface of the imaging of the imaging optical system 20) on which the light modulator parts are arranged in the light modulator element 10. But at an arbitrary position on an optical path from the light modulator element 10 to the image surface imaged by the imaging optical system 20, directions parallel to the vertical direction V will also be referred to as the vertical direction V, and directions parallel to the horizontal direction H will also be referred to as the horizontal direction H. In other words, the terms vertical direction V and horizontal direction H are also used for the imaging optical system 20.

The imaging optical system 20 includes a first imaging system 21 which is arranged on the side closer to the light modulator element 10 and has a positive power, and a second imaging system 22 which is arranged on the side closer to the deflecting section 40.

The imaging optical system 20 is approximately telecentric in the vertical direction V on the side of the light modulator element 10, and a relationship $|Mv/Mh|=1.5$ stands, where Mv denotes an imaging magnification in the vertical direction V and Mh denotes an imaging magnification in the horizontal direction H. Hence, an image which is converged on the imaging surface becomes a square pixel. The above telecentric properties are realized by the provision of the first imaging system 21. The second imaging system 22 cooperates with the first imaging system 21, to correct the curvature of field, color aberration and wavefront aberration of each image height and the like in the vertical direction V. The curvature of field correcting optical system 50 improves the velocity uniformity of the scanning light by the so-called fθ function, and substantially matches the image surface of the imaged bundle of rays, obtained by the deflecting and scanning, to the display surface 60.

A stopper 30 is arranged closer to the side of the imaging optical system 20, so as to realize a front stop at the time of inverse projection. Since the effective bundle of rays makes a maximum convergence at the position of the stopper 30, it is possible to reduce the size of the deflecting section 40 in the vertical direction V by arranging the deflecting section 40 adjacent to the stopper 30.

In this embodiment, the deflecting section 40 uses a rotary polygon mirror. Of course, the deflecting section 40 is not limited to the rotary polygon mirror, and any suitable deflecting means may be used, including a swinging mirror unit such as a rotary mirror and a galvano mirror, Acoust Optical (AO) element, and hologram scanner. The curvature of field correcting optical system 50 may be arranged adjacent to the deflecting section 40 for the purposes of reducing the size of the optical system. However, the position of the curvature of field correcting optical system 50 may be appropriately determined depending on the functions to be realized by the curvature of field correcting optical system 50.

The object image of the R modulator parts is imaged on the display surface 60 as one line, The object image of the G modulator parts is imaged on the display surface 60 as one line, and the object image of the B modulator parts is imaged on the display surface 60 as one line. The three lines imaged on the display surface 60 are arranged at predetermined intervals (or pitch). These three lines form the one-dimensional image imaged on the display surface 60. The three lines scan the display surface 60 at a high speed, while maintaining the above described pitch.

When the image imaged by the above described scan is observed, an observer visually confirms a two-dimensional color image on the display surface 60 due to the after image visible to the human eyes. In other words, it appears to the observer that the two-dimensional color image is imaged on the display surface 60.

Figure 2:
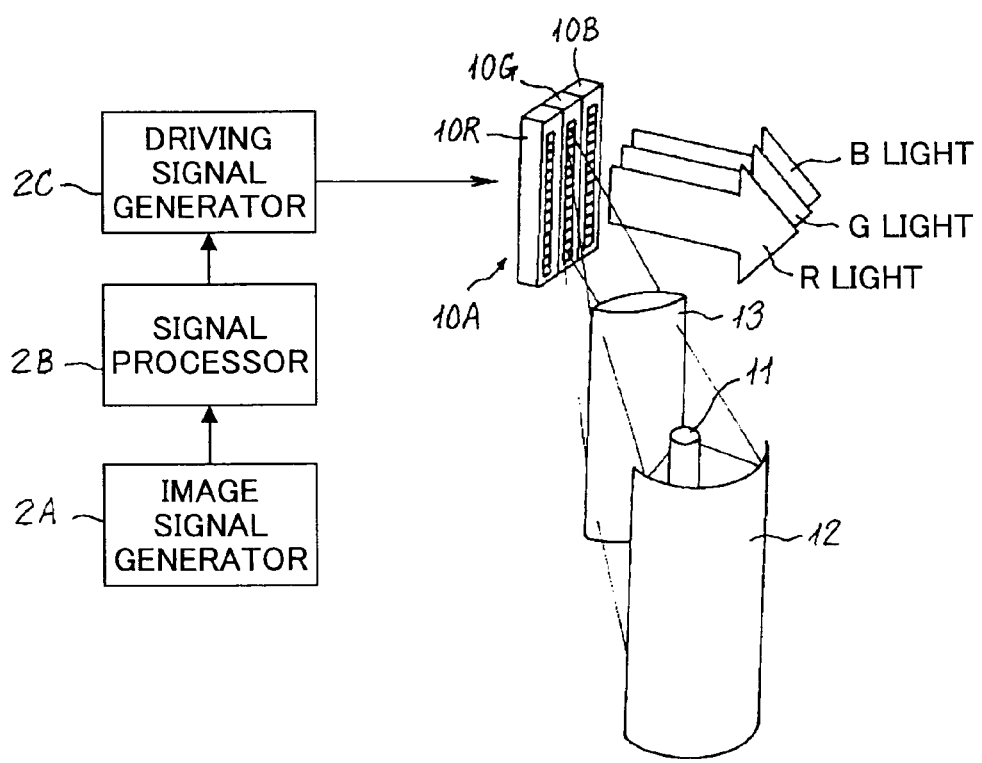
FIG. 2 is a diagram for explaining a self-non-emitting type light modulator element which is usable as a light source section of the image display apparatus shown in FIG. 1, together with an illuminating system.

FIG. 2 is a diagram for explaining a self-non-emitting type (or non-self-emitting type) light modulator element which is usable as a light source section of the image display apparatus shown in FIG. 1, together with an illuminating system. As opposed to the self-emitting type light modulator element which emits light by itself with a light emission intensity modulated depending on the image signal, the self-non-emitting type light modulator element does not emit light by itself but reflects or transmits light from a light source with a light intensity of the reflected or transmitted light in a predetermined direction modulated depending on the image signal.

Hence, the self-emitting type light modulator element may be formed by a laser diode (LD) array or a light emitting diode (LED) array, for example. On the other hand, the self-non-emitting type light modulator element may be formed by a micro mirror array device having a one-dimensional array of micro mirrors or a liquid crystal shutter device having a one-dimensional array of liquid crystal shutters.

The structure shown in FIG. 2 corresponds to a portion on the object side (the side of the light modulator element 10) of the imaging optical system 20 within the image display apparatus shown in FIG. 1.

The self-non-emitting type light modulator is formed by a reflection type light modulator element 10A. In this light modulator element 10A, R modulator parts, the G modulator parts and B modulator parts are arranged in columns in the vertical direction V, to form an R modulator element 10R, a G modulator element 10G and a B modulator element 10B, as shown in FIG. 2. The R, G and B modulator elements 10R, 10G and 10B are parallel to each other and are arranged at extremely small intervals (or pitch) in the horizontal direction H.

A linear light source 11 is formed by a halogen lamp. The linear light source 11 has a light emission length which is slightly longer than a length of each of the R, G and B modulator elements 10R, 10B and 10B respectively having the R, G and B modulator parts arranged in the vertical direction V.

For example, each of the R, G and B modulator elements 10R, 10G and 10B may be a combination of the light modulator element proposed in the Japanese Laid-Open Patent Application No. 2002-214550 described above and a corresponding one of R, G and B filters. Each of the R, G and B modulator elements 10R, 10G and 10B modulates the corresponding light by changing the direction of the reflected light by deformation of the reflection surface of each of the extremely small light modulator parts of the R, G and B modulator elements 10R, 10G and 10B. The light from the R modulator element 10R is colored to red (R) light by being transmitted through the R filter combined therewith. Similarly, the light from the G modulator element 10G is colored to green (G) light by being transmitted through the G filter combined therewith, and the light from the B modulator element 10B is colored to blue (B) light by being transmitted through the B filter combined therewith. The resulting R, G and B lights are received by the imaging optical system 20. In other words, the light modulator element 10A has R, G and B spectral characteristics.

One modulator part (one pixel) of each of the R, G and B modulator elements 10R, 10G and 10B has a reflection surface having a generally rectangular shape which is 20 $\mu$m in the vertical direction V and 40 $\mu$m in the horizontal direction (that is, 20 $\mu$m×40 $\mu$m). In each of the R, G and M modulator elements 10R, 10G and 10B, the modulator parts are arranged at a pitch of 21 $\mu$m in the vertical direction V. Hence, in each of the R, G and B modulator elements 10R, 10G and 10B, 768 modulator parts are arranged one-dimensionally within a length of approximately 16 mm. Hence, the corresponding R, G and B modulator parts of the R, G and B modulator elements 10R, 10G and 10B are arranged at a pitch of 80 $\mu$m in the horizontal direction H, with a space of approximately 40 $\mu$m between two mutually adjacent modulator parts in the horizontal direction.

In order to prevent trapezoidal distortion, that is, to prevent the shape of the image displayed on the display surface 60 from becoming trapezoidal, at the time of the projection, the light modulator element 10A is shifted by approximately 2 mm to 18 mm in the vertical direction V which is perpendicular to an optical axis of the imaging optical system 20 shown in FIG. 1.

The light emitted from the linear light source 11 is reflected by a cylindrical reflector (or mirror) 12 shown in FIG. 2, and is converged to a slit shape at the position of the light modulator element 10A by a cylindrical lens 13. For example, the illumination width of the light in the slit shape is 0.2 mm, but the light may actually be converged to a wider width to absorb manufacturing tolerance of parts, positioning error of parts and the like. The light converged on the light modulator element 10A is modulated by each of the R, G and B modulator elements 10R, 10G and 10B which respectively output image lights of each of the R, G and B colors. An image signal corresponding to the color image which is to be displayed is generated by an image signal generator 2A. The image signal from the image signal generator 2A is applied to the light modulator element 10A via a signal processor 2B and a driving signal generator 2C.

The cross sectional shape of the cylindrical reflector, when cut in the horizontal direction H, is not limited to a circular shape, and the shape may be oval, parabolic or non-arcuate including high-order terms. For example, the imaging optical system 20 which images the object light from the light modulator element 10A is set so that the projection distance is 2000 mm and the imaging length of the one-dimensional image is 900 mm.

Each of the R, G and B modulator parts of the light modulator element 10A has the shorter side arranged in the vertical direction V. Hence, the imaging (projecting) magnifications in the vertical and horizontal directions V and H become Mv=−56.3 and Mh=−28.2, and the imaging optical system 20 is optimized under the above described conditions. When the deflecting (or reflecting) surface of the deflecting section 40 shown in FIG. 1 rotates in a range of −8.5 degrees to +8.5 degrees with reference to a vertical line at the center of the display surface 60, the imaged bundle of rays is deflected in a range of −17 degrees to +17 degrees, to thereby scan 1153 mm of the display surface 60 in the scanning direction (horizontal direction H or, parallel to horizontal direction H) and display 1024 pixels in the scanning direction.

Next, a more detailed description will be given of the imaging optical system 20 shown in FIGS. 1 and 2. In the following description, it is assumed for the sake of convenience that the optical axis of the imaging optical system 20 extends in a direction X, the vertical direction V matches a direction Y, and the horizontal direction matches a direction Z of the XYZ coordinate system.

A non-arcuate shape of a cross section (XY plane) taken along the vertical direction V of a lens of the imaging optical system 20 is described by the following formula which is known for the aspherical shape using high-order terms from fourth to tenth order, where Rv denotes a paraxial radius of curvature of the lens surface within a cross section taken along the vertical direction V, Rh denotes a paraxial radius of curvature of the lens surface within a cross section taken along the horizontal direction H, $a_4$, ... denote coefficients, and radii of curvature, Cv and Ch, within each of the above cross sections, satisfy Cv=1/Rv and Ch=1/Rh.

$$X = Cv \cdot Y^2 / [1 + \sqrt{\{1 - (Kv+1) \cdot Cv^2 \cdot Y^2\}}] + a_4 \cdot Y^4 + a_6 \cdot Y^6 + a_8 \cdot Y^8 + a_{10} \cdot Y^{10}$$

A WT surface may be described by the following formula using the high-order terms from the second to eighth order and Cs which is described by $$Cs = Ch + b_2 \cdot Y^2 + b_4 \cdot Y^4 + b_6 \cdot Y^6 + b_8 \cdot Y^8,$$

where $b_2$, ... denote coefficients.

$$X = Cv \cdot Y^2 / [1 + \sqrt{\{1 - (Kv+1) \cdot Cv^2 \cdot Y^2\}}] + a_4 \cdot Y^4 + a_6 \cdot Y^6 + a_8 \cdot Y^8 + a_{10} \cdot Y^{10} + Cs \cdot Z^2 / [1 + \sqrt{\{1 - (Kh+1) \cdot Cs^2 \cdot Z^2\}}]$$

An XZ non-arcuate surface may be described by the following formula using high-order terms from the fourth to sixth order, where $d_2$, ... and $e_2$, ... denote coefficients. In this embodiment Kv=Kh=0.

$$X = Cv \cdot Y^2 / \left[1 + \sqrt{\{1 - (Kv+1) \cdot Cv^2 \cdot Y^2\}}\right] + a_4 \cdot Y^4 + a_6 \cdot Y^6 +$$
$$a_8 \cdot Y^8 + a_{10} \cdot Y^{10} + Cs \cdot Z^2 / \left[1 + \sqrt{\{1 - (Kh+1) \cdot Cs^2 \cdot Z^2\}}\right] +$$
$$(d_2 \cdot Y^2 + d_4 \cdot Y^4 + d_6 \cdot Y^6 + d_8 \cdot Y^8) \cdot Z^4 +$$
$$(e_2 \cdot Y^2 + e_4 \cdot Y^4 + e_6 \cdot Y^6 + e_8 \cdot Y^8) \cdot Z^6$$

In this first embodiment, the representation is made according to the inverse projection in accordance with the general rule employed in optical systems. In other words, the display surface 60 at the enlarged end is regarded as an object, and a surface of the light modulator element 10A having the array of light modulator parts is regarded as an image surface.

When the object distance is 2000 mm and the reduced magnification is approximately −1/50 times, one pixel which is 1 mm in the vertical direction V is reduced and imaged to 0.02 mm.

FIGS. 3A and 3B are diagrams for explaining a first embodiment of an imaging optical system according to the present invention which may be used in the first embodiment of the image display apparatus shown in FIG. 1. FIG. 3A shows a cross section of the imaging optical system 20 cut along the vertical direction V, and FIG. 3B shows a cross section of the imaging optical system 20 cut along the horizontal direction.

As shown in FIGS. 3A and 3B, the imaging optical system 20 includes a stopper S and lenses L1 through L4. The right side in FIGS. 3A and 3B corresponds to the side of the light modulating element 10 (or 10A). Each of the lenses L1 through L4 has two opposing surfaces which are formed by special anamorphic surfaces. In addition, the lenses L2 and L3 are joined or bonded to form a spherical lens.

The imaging optical system 20 and the light modulator element 10 or 10A form a first embodiment of an imaging optical apparatus according to the present invention.

FIGS. 4A and 4B are diagrams for explaining the aberration of the first embodiment of the imaging optical system. FIGS. 4A and 4B respectively show the curvature of field (image surface curvature) and the distortion of the imaging optical system 20 for the d-ray. In FIG. 4A, the broken line indicates the curvature of field in the vertical direction V, and the solid line indicates the curvature of field in the horizontal direction H.

FIGS. 10 and 11 are diagrams showing various parameters related to the surfaces of the imaging optical system 20 shown in FIGS. 3A and 3B.

FIG. 10 shows parameters Rv (mm), Rh (mm), d (mm) and Nd with respect to each surface i of the imaging optical system 20, where d denotes the distance (or length) along the optical axis between two adjacent surfaces i and i+1, Nd denotes the refractive index of helium (He) d-ray (wavelength $\lambda_d$=587.56 nm) for the optical material used, and i=1, ..., 9. The surface i=1 corresponds to the right stopper surface of the stopper S, the surface i=2 corresponds to the left XZ non-arcuate surface of the lens L1, and i=3 corresponds to the right WT surface of the lens L1. The surface i=4 corresponds to the left spherical surface of the lens L2, the surface i=5 corresponds to the right spherical surface of the lens L2 (and also the left spherical surface of the lens L3), and the surface i=6 corresponds to the right spherical surface of the lens L3. The surface i=7 corresponds to the left WT surface of the lens L4, the surface i=8 corresponds to the right XZ non-arcuate surface of the lens L4, and the surface i=9 corresponds to the imaging surface (surface of the light modulator element 10 having the light modulator parts).

FIG. 11 shows the coefficients a through e for each surface i of the imaging optical system 20. FIG. 11 shows the second, fourth, sixth, eighth and tenth order coefficients a through e, and "E-MN" indicates "$\times 10^{-MN}$".

In this case, the following relationships stand, where Mv denotes an imaging magnification in the vertical direction V, Mh denotes an imaging magnification in the horizontal direction H, Piv denotes the power in the vertical direction V of the lens arranged on the side of the imaging surface 60, Pih denotes the power in the horizontal direction H of the lens arranged on the side of the imaging surface 60, Pov denotes the power in the vertical direction V of the lens arranged on the side of the light modulator element 10, and Poh denotes the power in the horizontal direction H of the lens arranged on the side of the light modulator element 10.

$Mv$=−73.93, $Mh$=−59.16, $|Mv/Mh|$=1.25, $Piv$=$Piv(L1)$=−0.014, $Pih$=$Pih(L1)$=−0.005, $Pov$=$Pov(L4)$=0.016, $Poh$=$Poh(L4)$=−0.0005

Figure 5:
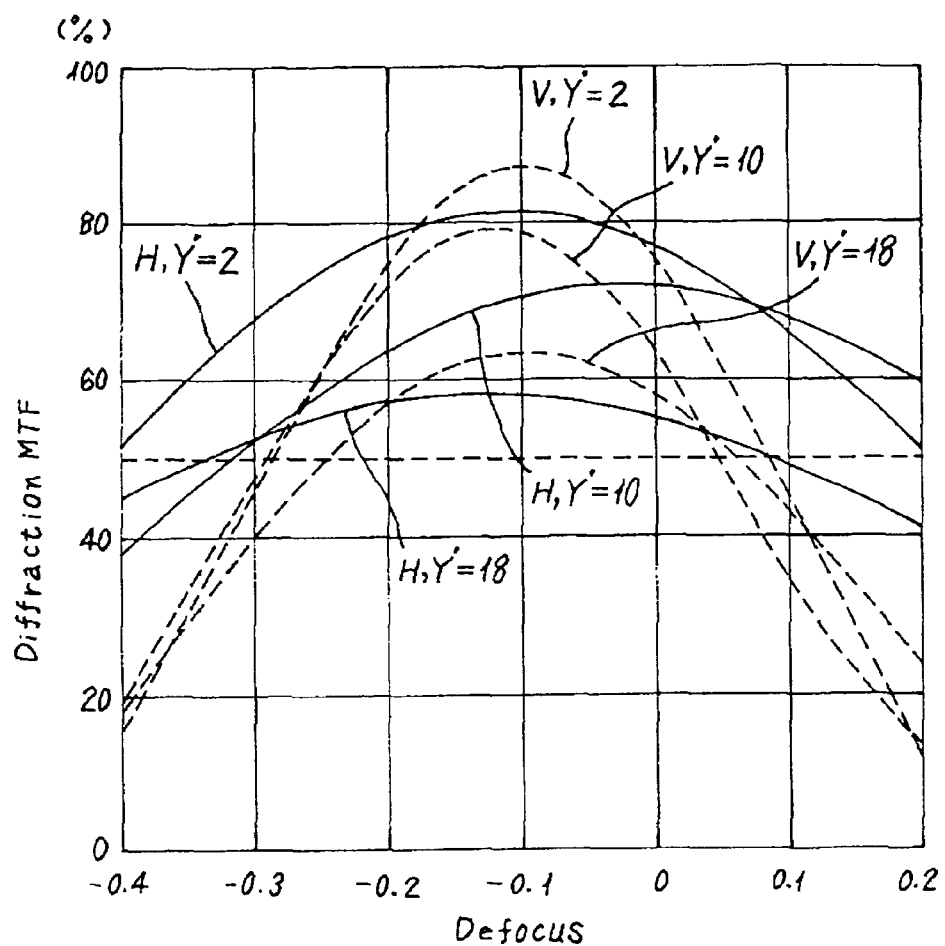
FIG. 5 is a diagram for explaining an MTF of the first embodiment of the imaging system.

FIG. 5 is a diagram for explaining an MTF of the first embodiment of the imaging optical system. FIG. 5 shows the MTF for a frequency of 23.8 lines/mm on the side of the light modulator element 10 subjected to the inverse projection. In FIG. 5, the ordinate indicates the diffraction MTF, and the abscissa indicates the defocus. In addition, a broken line indicates the MTF in the vertical direction V, and the solid line indicates the MTF in the horizontal direction H. The MTF is shown at positions 2 mm (H, Y'=2, V, Y'=2), 10 mm (H, Y'=10, V, Y'=10) and 18 mm (H, Y'=18, V, Y'=18) from the optical axis of the light modulator element 10.

Therefore, in this first embodiment, the imaging optical system 20 uses as the object the light modulator element 10 or 10A having the one-dimensional array of extremely small light modulator parts. The bundle of rays from the light modulator element 10 or 10A is regarded as the object light, and the imaging optical system 20 images the object light one-dimensionally on the image surface. The imaging optical system 20 may have at least two anamorphic surfaces (i=2, 3, 7, 8) each having radii of curvature which are different on an object surface in the vertical direction V and the horizontal direction H which is perpendicular to the vertical direction V, so that imaging surfaces in the vertical and horizontal directions V and H match. At least one (i=3, 7) of the at least two anamorphic surfaces may have a bent axis toroidal surface (WT surface) with a non-arcuate shape within a cross section cut along the vertical direction V, and a curvature center line of the bent axis toroidal surface formed by joining centers of curvature of cross sections cut along the horizontal direction H is a curve. At least one (i=2, 8) of the at least two anamorphic surfaces may have a first non-arcuate shape within a cross section cut along the vertical direction V, and a second non-arcuate shape within a cross section cut along the horizontal direction H, and the second non-arcuate shape (XZ non-arcuate surface) is variable depending on a coordinate of thereof in the vertical direction V.

The cross section cut along the vertical direction V is a cross section which is obtained by cutting the anamorphic surface along a virtual plane which is parallel to the vertical direction V and includes the optical axis of the anamorphic surface. On the other hand, the cross section cut along the horizontal direction H is a cross section which is obtained by cutting the anamorphic surface along a virtual plane which is perpendicular to the vertical direction V. The cross section cut along the vertical direction V is uniquely determined because this cross section includes the optical axis of the anamorphic surface. However, the cross sections cut along the horizontal direction H are infinite along the vertical direction H.

In addition, an imaging magnification Mv in the vertical direction V and an imaging magnification Mh in the horizontal direction H may satisfy a relationship $|Mv/Mh|$=1.25>1. A principal point in the vertical direction V may be set at a position closer to the light modulator element 10 or 10A than that of a principal point in the horizontal direction H, through the entire imaging optical system 20. The imaging optical system 20 may be approximately telecentric in the vertical direction V on a side closer to the light modulator element 10 or 10A.

As shown in FIGS. 3A and 3B, the imaging optical system 20 has the stopper S arranged closer to the imaging surface than the light modulator element 10 or 10A. The imaging optical system 20 may also have an imaging system formed by a plurality of lenses L1 through L4, where at least two of the plurality of lenses (L1, L4) have different focal distances in the vertical and horizontal directions V and H, focal distances which differ in the vertical and horizontal directions V and H for the entire imaging optical system 20, and different imaging magnifications on the image surface.

In the imaging optical system 20, at least one (L4) of the plurality of lenses (L1 to L4) which is arranged closer to the imaging surface than the light modulator element 10 or 10A may have a power Piv in the vertical direction V and a power Pih in the horizontal direction H which satisfy a relationship Piv<Pih, and at least one (L1) of the plurality of lenses (L1 to L4) which is arranged closer to the light modulator element 10 or 10A than the imaging surface may have a power Pov in the vertical direction V and a power Poh in the horizontal direction H which satisfy a relationship Pov>Poh.

Furthermore, in this first embodiment, the image display apparatus has the light modulator element 10 or 10A which has light modulator parts arranged one-dimensionally in the vertical direction V, the imaging optical system 20 to image a one-dimensional image on an image surface by regarding the light modulator element 10 or 10A as the object and regarding the bundle of rays from the light modulator element 10 or 10A as the object light, where the imaging optical system 20 includes at least two anamorphic surfaces (i=2, 3, 7, 8) each having radii of curvature which are different on an object surface in the vertical direction V and the horizontal direction H which is perpendicular to the vertical direction V, so that imaging surfaces in the vertical and horizontal directions V and H match, and a display section to display an image on the display surface 60 by imaging the one-dimensional image on the display surface 60 via the imaging optical system 20 and relatively scanning the one-dimensional image and the display surface 60 in a direction perpendicular to a longitudinal direction of the one-dimensional image.

Since the one-dimensional image and the display surface 60 are relatively scanned in the direction perpendicular to the longitudinal direction of the one-dimensional image, the one-dimensional imagemay be displaced in the direction perpendicular to the longitudinal direction to scan the display surface 60 or, the position of the one-dimensional image may be fixed spatially and the display section may be displaced. Furthermore, it is of course possible to displace both the one-dimensional image and the display section.

The two-dimensional image may be displayed by using a screen for the display section and repeatedly scanning the one-dimensional image at a high speed with respect to the screen. In addition, the one-dimensional image which is imaged at a spatially fixed position may relatively scan a photosensitive display section which is made up of a photosensitive film or the like, so as to form an image by exposure.

In the image display apparatus, the light modulator element 10A may have a first modulator element 10R having light modulator parts with spectral characteristics for red (R) color and arranged one-dimensionally in the vertical direction V, a second modulator element 10G having light modulator parts with spectral characteristics for green (G) color and arranged one-dimensionally in the vertical direction V, and a third modulator element 10B having light modulator parts with spectral characteristics for blue (B) color and arranged one-dimensionally in the vertical direction V, where the first, second and third modulator elements 10R, 10G and 10B are arranged parallel to each other so that each of the first, second and third modulator elements 10R, 10G and 10B is adjacent to at least one of the first, second and third modulator elements 10R, 10G and 10B.

The display section may overlap the red (R), green (G) and blue (B) colors with a timing difference to perform a color composite on the same pixel imaging position when relatively scanning the one-dimensional image and the display surface 60.

The display section may have the deflecting section 40 to deflect an imaged bundle of rays obtained via the imaging optical system 20, so as to scan the one-dimensional image with respect to the display surface 60 which is planar, and the curvature of field correcting optical system 50, disposed between the deflecting section 40 and the display surface 60, to substantially match an image surface of the imaged bundle of rays deflected and scanned by the deflecting section 40 to the display surface 60.

Figure 6:
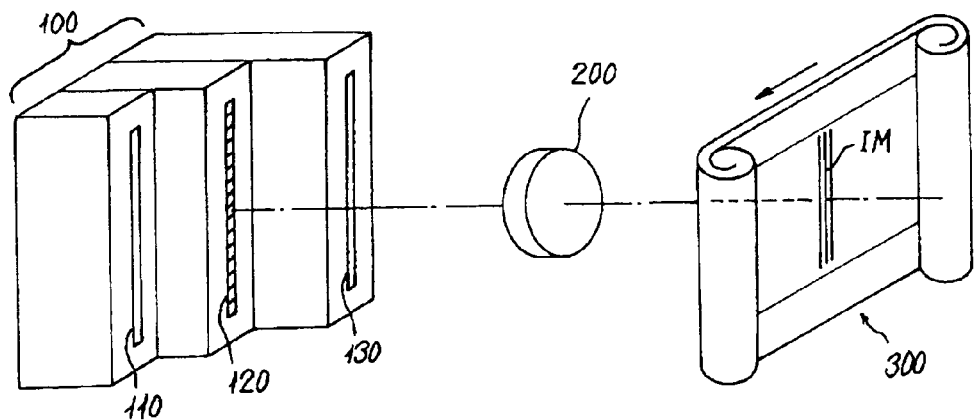
FIG. 6 is a diagram showing a second embodiment of the image display apparatus according to the present invention.

Next, a description will be given of a second embodiment of the image display apparatus according to the present invention. FIG. 6 is a diagram showing this second embodiment of the image display apparatus which operates as an optical printer.

In the image display apparatus shown in FIG. 6, a one-dimensional image IM corresponding to a one-dimensional array of extremely small light modulator parts of a light modulator element 100 is imaged on a display surface 300 of a display section (or means). The one-dimensional image IM and the display surface 300 are relatively scanned in a direction of an arrow which is perpendicular to a longitudinal direction of the one-dimensional image IM, so as to display an image on the display surface 300. The light modulator element 100 and an imaging optical system 200 form a second embodiment of the imaging optical apparatus according to the present invention.

The display surface 300 of the displays section (or means) is exposed and recorded with a two-dimensional image by the scanning of the one-dimensional image IM. The recorded two-dimensional image is visualized to obtain a displayed image.

The light modulator element 100 is formed by self-emitting type R modulator element 110, G modulator element 120 and B modulator element 130. The R modulator element 110 has light modulator parts (pixels) which emit the red (R) light arranged one-dimensionally in the vertical direction V. The G modulator element 120 has light modulator parts (pixels) which emit the green (G) light arranged one-dimensionally in the vertical direction V. The B modulator element 130 has light modulator parts (pixels) which emit the blue (B) light arranged one-dimensionally in the vertical direction V.

The imaging optical system 200 is formed by a single lens. A physical distance of at least one of the R, G and B modulator elements 110, 120 and 130 from the imaging optical system 200 along an optical axis of the imaging optical system 200 is different from those of the other two modulator elements. In this embodiment, the distances from the surfaces of the R, G and B modulator elements 110, 120 and 130 provided with the light modulator parts to the imaging optical system 200 along the optical axis are mutually different, so that the imaging surfaces of the R, G and B lights emitted from the R, G and B modulator elements 110, 120 and 130 match on the display surface 300 regardless of the color aberration of the imaging optical system 200.

The physical distance is an actual mechanical distance within the apparatus space, and is not the same as an optical distance.

In other words, since a suitable difference $\Delta p$ in the optical path lengths (optical distance) to be set on the object side can be described by $\Delta p = \Delta L / M^2$, where $\Delta L$ denotes a difference in the imaging positions of the colors in the direction along the optical axis and M denotes an imaging magnification, a means is provided on the object side for setting the difference in the optical path lengths, that is, the difference $\Delta p$ in the distances from the surfaces of the R, G and B modulator elements 110, 120 and 130 having the light modulator parts to the imaging optical system 200 along the optical axis, so that the one-dimensional images of each of the colors are imaged on the display surface 300.

In the imaging optical apparatus shown in FIG. 6 which is formed by the light modulator element 100 and the imaging optical system 200, a length of an imaging optical path for at least one of the colors is desirably different from those of imaging optical paths of the other two colors, so as to correct differences in magnifications in a direction corresponding to the vertical direction V caused by color aberration. For example, the lengths of the imaging optical paths are different for each of the colors.

Figure 7:
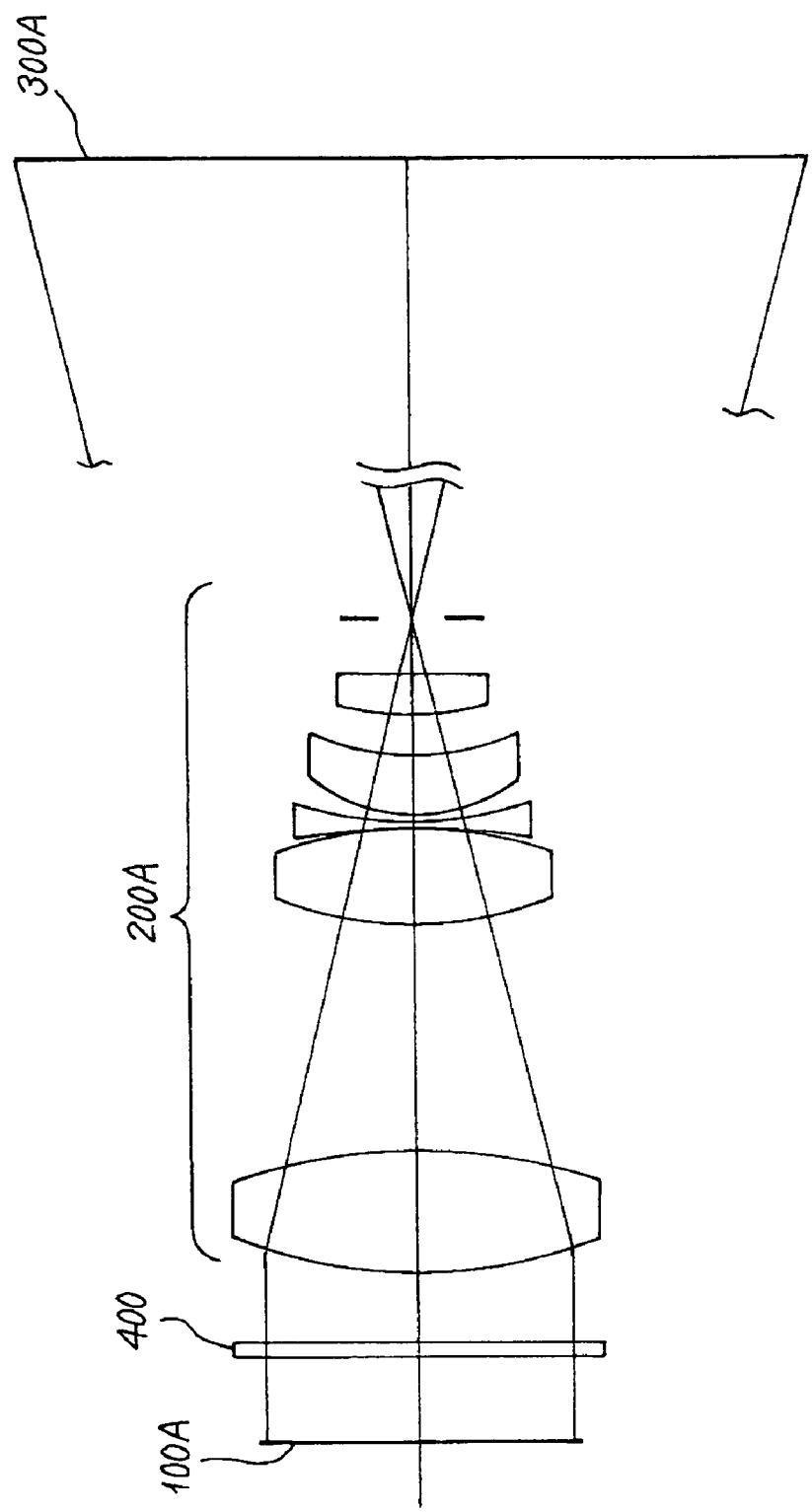
FIG. 7 is a diagram for explaining an optical arrangement of a second embodiment of the imaging optical system according to the present invention.

FIG. 7 is a diagram for explaining an optical arrangement of this second embodiment of the imaging optical system. In FIG. 7, a surface 100A is provided with the extremely small light modulator parts of the light modulator element 100.

For example, the light modulator element 100 is formed by a liquid crystal shutter array having square shutters (pixels) having a side of 10 $\mu$m. 1536 shutters are arranged in one column, and 3 such columns are arranged parallel to and adjacent to each other. The shutters are illuminated from the rear by a white surface light source. The light transmitted through the shutters is transmitted through a cover glass 400 and reaches an imaging optical system 200A.

The cover glass 400 has an integral or separate cover glass portion corresponding to each of the columns of shutters forming the light modulator element 100, so as to subject the light transmitted through the light modulator element 100 to a color separation to obtain the red (R) light (c-line: wavelength of 656.27 nm), the green (G) light (e-line: wavelength of 546.07 nm) and the blue (B) light (g-line: wavelength of 435.83 nm).

The arrangement of the R, G and B shutters (pixels) of the light modulator element 100 in the horizontal direction H is such that the G shutters are arranged in the vicinity of the optical axis of the imaging optical system 200A, and the R shutters and the B shutters sandwich the G shutters along the horizontal direction H.

The imaging optical system 200A has a focal distance of 32 mm, and the light from the light modulator element 100 is imaged on a display surface 300A which is 1.34 m from the light modulator element 100, with a magnification of 40 times. Accordingly, one pixel on the display surface 300A has a square shape with a size of 0.4 mm on each side. In a case where the cover glass portions of the cover glass 400 corresponding to the R, G and B modulator elements of the light modulator element 100 have the same thickness, and the G light imaged on the imaging surface is taken as a reference, the error in the imaging position (error in the vertical magnification) of the B light imaged on the imaging surface with respect to the reference G light is $\Delta L(B\sim G)=3.3$ mm and small. But the error in the imaging position (error in the vertical magnification) of the R light imaged on the imaging surface with respect to the reference G light is $\Delta L(R\sim G)=60.8$ mm and large. Hence, if $\Delta L(B\sim G)$ and $\Delta L(R\sim G)$ are used to calculate the above described difference $\Delta p=\Delta L/M^2$, $\Delta p(B\sim G)$ and $\Delta p(R\sim G)$ respectively become $\Delta p(B\sim G)=0.002$ mm and $\Delta p(R\sim G)=0.038$ mm.

Accordingly, error $\Delta L(B\sim G)$ is ignored, and the difference $\Delta p(R\sim G)$ in the optical path lengths is corrected by the thickness of the cover glass portion of the cover glass 400. There is substantially no deterioration in the displayed image even when the error $\Delta L(B\sim G)$ is ignored.

When the refractive index of the material forming the cover glass 400 is denoted by n, a thickness $\Delta d$ of the cover glass 400 satisfying the above described relationship $\Delta p=\Delta L/M^2$ becomes $\Delta d=\Delta p\cdot n/(n-1)$. Hence, if n=1.52, a difference $\Delta d(B\sim G)$ between the thicknesses of the cover glass portions corresponding to blue (B) and green (G) becomes $\Delta d(B\sim G)=0.006$ mm, and a difference $\Delta d(R\sim G)$ between the thicknesses of the cover glass portions corresponding to red (R) and green (G) becomes $\Delta d(R\sim G)=0.111$ mm. Hence, the difference $\Delta d(B\sim G)$ between the thicknesses of the cover glass portions corresponding to blue (B) and green (G) of the cover glass 400 is ignored, and the thicknesses of the cover glass portions corresponding to blue (B) and green (G) are made the same, while only the thickness of the cover glass portion corresponding to red (R) is made 0.111 mm thinner than the cover glass portions corresponding to blue (B) and green (G). As a result, it is possible to substantially match the image surfaces of the one-dimensional images of each of the colors red (R), green (G) and blue (B) at the display surface 300A.

In this case, the physical (or mechanical) distance from the light modulator element 100 to the imaging optical system 200A is the same for each of the R, G and B modulator elements 110, 120 and 130. However, due to the different thicknesses of the corresponding cover glass portions of the cover glass 400, the optical distances (optical path lengths) become mutually different for the R, G and B modulator elements 110, 120 and 130 depending on the refractive indexes of the corresponding cover glass portions of the cover glass 400.

FIG. 12 is a diagram showing various parameters related to surfaces of the imaging optical system 200A shown in FIG. 7. FIG. 12 shows parameters R (mm) D (mm), Nd and vd with respect to each surface i of the imaging optical system 200A, where R denotes the paraxial radius of curvature, D denotes a separation (or distance between) two adjacent surfaces i and i+1, Nd denotes the refractive index of helium (He) d-ray (wavelength $\lambda_d$=587.56 nm) for the optical material used, vd denotes the Abbe's number by d-ray, and i=1, . . . , 10. The surface i indicates each lens surface of the five lenses forming the imaging optical system 200A, and the value of i increases starting from the leftmost lens surface towards the rightmost lens surface. Aspherical surfaces are used for the aberration correction, but for the purposes of explaining the paraxial color aberration, the data related to the aspherical surfaces are not shown in FIG. 12 for the sake of convenience because there are no effects of the aspherical surfaces. It is also assumed that each lens surface i is in rotation symmetry with respect to the optical axis of the imaging optical system 200A.

Figure 8:
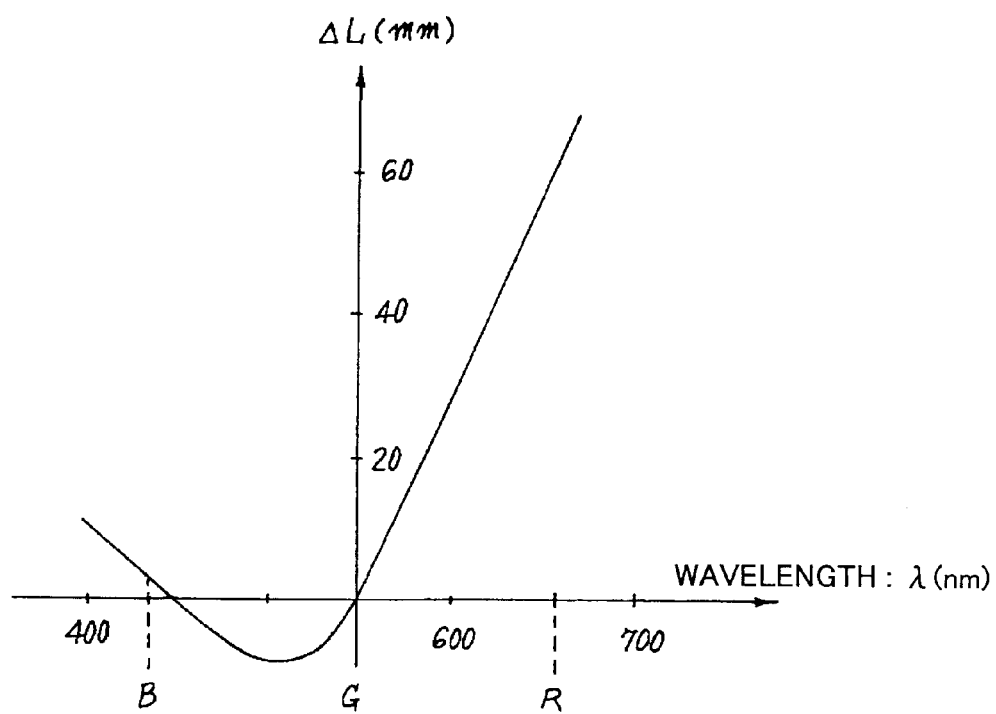
FIG. 8 is a diagram showing imaging positions of three colors red (R), green (G) and blue (B) based on color aberration related to the second embodiment of the imaging optical system shown in FIG. 7.

FIG. 8 is a diagram showing imaging positions of three colors red (R), green (G) and blue (B) based on color aberration related to the second embodiment of the imaging optical system shown in FIG. 7. In FIG. 8, the ordinate indicates the difference $\Delta L$ (mm) in the imaging positions of the colors in the direction along the optical axis of the imaging optical system 200A, and the abscissa indicates the wavelength $\lambda$ (nm). The difference $\Delta L$ (mm) in the imaging positions of the colors is corrected by the difference in the thicknesses of the cover glass portions of the cover glass 400 described above.

Therefore, this second embodiment of the imaging optical apparatus is provided with the light modulator element 100 comprising the R modulator element 110 having light modulator parts with spectral characteristics for red (R) color and arranged one-dimensionally in the vertical direction V, the G modulator element 120 having light modulator parts with spectral characteristics for green (G) color and arranged one-dimensionally in the vertical direction V, and the B modulator element 130 having light modulator parts with spectral characteristics for blue (B) color and arranged one-dimensionally in the vertical direction V, where the R, G and B modulator elements 110, 120 and 130 are arranged parallel to each other so that each of the R, G and B modulator elements 110, 120 and 130 is adjacent to at least one of the R, G and B modulator elements 110, 120 and 130, and the imaging optical system 200A to image lights from the R, G and B modulator elements 110, 120 and 130 of the light modulator element 100 one-dimensionally on the common display surface 300A. The length of an imaging optical path for at least one of the colors is different from those of imaging optical paths of the other two colors, so as to correct differences in magnifications in a direction corresponding to the vertical direction V caused by color aberration.

The physical distance of at least one of the R, G and B modulator elements 110, 120 and 130 from the imaging optical system 200A along the optical axis of the imaging optical system 200A may be different from those of the other two modulator elements.

The modulator parts of each of the R, G and B modulator elements 110, 120 and 130 are arranged on the same plane so that physical distances of the R, G and B modulator elements 110, 120 and 130 from the imaging optical system 200A along the optical axis of the imaging optical system 200A are approximately the same. In addition, the imaging optical apparatus includes a first transparent plate (cover glass portion corresponding to R) disposed adjacent to and parallel to the R modulator element 110, a second transparent plate (cover glass portion corresponding to G) disposed adjacent to and parallel to the G modulator element 120, and a third transparent plate (cover glass portion corresponding to B) disposed adjacent to and parallel to the B modulator element 130. One of the first, second and third transparent plates may have a thickness different from those of the other two transparent plates, so as to mutually correct lengths of imaging optical paths respectively through the first, second and third transparent plates.

The lengths of imaging optical paths with respect to the G and B modulator elements 120 and 130 may be approximately the same, and a length of an imaging optical path with respect to the R modulator element 110 may be longer than the lengths of the imaging optical paths with respect to the G and B modulator elements 120 and 130.

The G modulator element 120 may be disposed adjacent to the optical axis of the imaging optical system 200A, and the R and B modulator elements 110 and 130 may be disposed to sandwich the G modulator element 120 in the horizontal direction H which is perpendicular to the vertical direction V.

Moreover, this second embodiment of the image display apparatus may be provided with the light modulator element 100 comprising the R modulator element 110 having light modulator parts with spectral characteristics for red (R) color and arranged one-dimensionally in the vertical direction V, the G modulator element 120 having light modulator parts with spectral characteristics for green (G) color and arranged one-dimensionally in the vertical direction V, and the B modulator element 130 having light modulator parts with spectral characteristics for blue (B) color and arranged one-dimensionally in the vertical direction V, where the R, G and B modulator elements 110, 120 and 130 are arranged parallel to each other so that each of the R, G and B modulator elements 110, 120 and 130 is adjacent to at least one of the R, G and B modulator elements 110, 120 and 130, the imaging optical system 200A to image lights from the R, G and B modulator elements 110, 120 and 130 of the light modulator element 100 one-dimensionally on the image surface, and the display section to display an image on the display surface 300A by imaging the one-dimensional image on the display surface 300A via the imaging optical system 200A and relatively scanning the one-dimensional image and the display surface 300A in a direction perpendicular to a longitudinal direction of the one-dimensional image. The length of an imaging optical path for at least one of the colors may be different from those of imaging optical paths of the other two colors, so as to correct differences in magnifications in a direction corresponding to the vertical direction V caused by color aberration.

Therefore, by employing the optical arrangement shown in FIG. 7 on the light source side of the deflecting section 40 shown in FIG. 1, it is possible to deflect and scan the imaged bundle of rays so as to display a two-dimensional color image on the display surface 300A. In this case, the color image has 1536 pixels in the vertical direction V and 1028 pixels in the horizontal direction H on the display surface 300A.

Figure 9A:
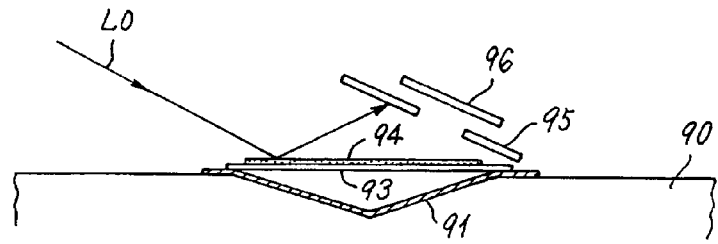
FIGS. 9A and 9B are diagrams for explaining a light modulator element.
Figure 9B:
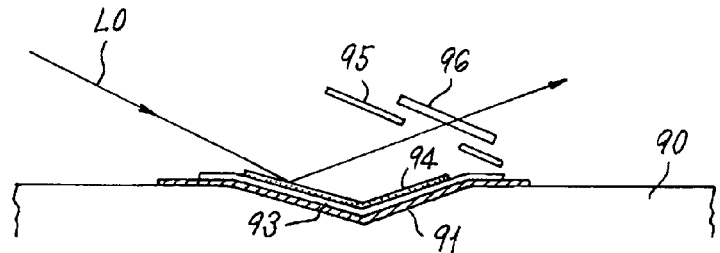

FIGS. 9A and 9B are diagrams for explaining a light modulator element suited for use in the present invention. An important part of the light modulator element shown in FIGS. 9A and 9B are described in the Japanese Laid-Open Patent Application No. 2002-214550 referred above. Method of fabrication, materials suited for use, and driving and operating principles of this light modulator element are described in detail in the Japanese Laid-Open Patent Application No. 2002-214550. FIGS. 9A and 9B shows one light modulator part of the light modulator element.

In FIG. 9A, a shallow groove having a V-shaped cross section is formed in a planar portion of a dielectric substrate 90, and an extremely small electrode 91 to be driven is formed in a bottom portion of the V-shaped groove. A dielectric thin film 93 is formed on the dielectric substrate 90 so as to cover the V-shaped groove. Both ends on the right and left of the dielectric thin film 93 in FIG. 9A are fixed on the electrode 91. A reflection layer 94 is formed on the thin film 93.

FIG. 9A shows a state where a modulating signal is OFF. In this OFF state, an illumination light L0 incident to the reflection layer 94 will be reflected and blocked by a blocking plate 95.

On the other hand, FIG. 9B shows a state where the modulating signal is ON. In this ON state, the modulating signal applied to the electrode 91 generates an electric field which causes the dielectric thin film 93 to deform according to the shape of the V-shaped groove. Hence, the reflection layer 94 is also deformed and becomes inclined. As a result, the illumination light L0 incident to the reflection layer 94 is reflected in a direction which is displaced in a clockwise direction compared to FIG. 9A due to the large angle of incidence, and the reflected light is transmitted through an aperture formed in the blocking plate 95. This aperture corresponds to one pixel or object with respect to the imaging optical system 200A. The light transmitted through the aperture is then transmitted through a color filter 96 and subjected to color separation.

Accordingly, it is possible to obtain light which has been subjected to the color separation and is in accordance with the modulating signal. The light modulator part such as that shown in FIGS. 9A and 9B is arranged at a predetermined pitch in a direction perpendicular to the paper, so as to form one modulator element, and three such modulator elements are arranged as the R, G and B modulator elements to form the light modulator element. In this case, the blocking plate 95 is provided in common for each of the three modulator elements, and the color filter 96 is provided for each of the three modulator elements. In other words, one color filter 96 is provided in common for each of the light modulator parts forming the corresponding one of the three modulator elements. The light modulator element having the above described structure is suited for use as the light modulator element 10, 10A or 100.

Of course, in each of the embodiments described above, the colors used to form the color image are not limited to red (R), green (G) and blue (B). The colors red (R), green (G) and blue (B) are typical examples, and any suitable colors may be used to form the color image. For example, it is possible to use yellow (Y), magenta (M) and cyan (C) to form the color image.

Furthermore, the R, G and B modulator elements (or Y, M and C modulator elements) may be integrally formed on the light modulator element. Alternatively, the R, G and B modulator elements (or Y, M and C modulator elements) may be provided independently on the light modulator element.

As typified by a liquid crystal projector, the image which is displayed on the image display apparatus is enlarged and displayed on the screen in many cases. In such cases, each aberration of the imaging optical system which images the displayed image must be corrected in a satisfactory manner.

For example, if the correction of the curvature of field is insufficient, a peripheral portion of the image displayed on the screen may become blurred, and a distortion may be generated in the displayed image if the correction of the distortion is insufficient. In addition, if the correction of the color aberration of the magnification is insufficient, color bleeding may appear at the peripheral portion of the displayed image when displaying the color image.

As is well known, the larger the number of parameters used for the design of the imaging optical system, the larger the degree of freedom of design, thereby making it easier to realize a desired optical performance.

When using a two-dimensional light modulator element as in the case of the conventional liquid crystal projector, for example, a projection lens (imaging optical system) used to project the image on the screen is in rotation symmetry with respect to the optical axis. Hence, even if an aspherical surface were to be used, the shape of the aspherical surface would be determined depending on a radius of the lens, and the parameter which determines the shape of the aspherical surface will only be the distance from the optical axis in the radial direction of the lens.

In each of the embodiments of the imaging optical system described above, the object which is the target to be imaged, is the light modulator element having the extremely small light modulator parts arranged one-dimensionally, and a two-dimensional spreading can substantially be ignored. Hence, by using the anamorphic imaging optical system for the imaging instead of using an imaging optical system which is in rotation symmetry with respect to the optical axis, the design parameters are increased to increase the degree of freedom of design, and it is easier to design an improved imaging performance for the one-dimensional image.

In other words, two or more surfaces of the imaging optical elements in the imaging optical system are anamorphic surfaces. Hence, by changing the conventional shape which is in rotation symmetry with respect to the optical axis into the shape which is in rotation asymmetry with respect to the optical axis, it becomes possible to independently select some of the parameters used for the aberration correction in the vertical direction (meridional image surface) and the horizontal direction (sagittal image surface), and the degree of freedom of design of the imaging optical system is improved.

The two or more anamorphic surfaces have different radii of curvature in the vertical direction V and the horizontal direction H, so that the imaging surfaces in the vertical and horizontal directions V and H match. In this case, although the imaging magnification of the imaging optical system is different in the vertical and horizontal directions V and H, the pixels imaged on the image surface can be made to have approximately the same size in both the vertical and horizontal directions V and H, by making the size of the extremely small light modulator parts corresponding to each of the pixels in reverse proportion to the imaging magnifications in the vertical and horizontal directions V and H. In addition, since the pixel size (size of the light modulator part) of the light modulator element can be determined in reverse proportion to the imaging magnifications in the vertical and horizontal directions V and H, it is possible to increase the degree of freedom of fabricating the light modulator element and also improve the performance of the imaging optical system.

For example, if the imaging magnifications in the vertical and horizontal directions V and H of the imaging optical system are set so that the pixel size in the horizontal direction H decreases in the light modulator element, it is possible to increase the number of light modulator elements fabricated from a single wafer, to thereby improve the throughput.

On the other hand, if the imaging magnification of the imaging optical system in the horizontal direction H is set smaller than the imaging magnification in the vertical direction V so that the pixel size in the horizontal direction H increases in the light modulator element, it is possible to increase the amount of light of the imaging and obtain a bright image.

If at least one of the anamorphic surfaces of the imaging optical system is a WT surface, it is possible to reduce the bend of the sagittal image surface by the setting of the parameters of the paraxial toroidal surface. In addition, by the setting of the non-arcuate shape in the vertical direction V and other parameters, it is possible to place emphasis on the correction of the bend of the meridional image surface, spherical aberration, distortion and the like. As a result, the improvement of the optical performance is facilitated.

If at least one of the two or more anamorphic surfaces of the imaging optical system is an XZ non-arcuate surface, it is possible to correct the sagittal coma by introducing the non-arcuate shape in the horizontal direction. Thus, other parameters can be used by placing emphasis on the correction of the meridional coma, and a high optical performance can be realized by reducing the wavefront aberration.

The relationship |Mv/Mh|>1 between the imaging magnification Mv in the vertical direction V and the imaging magnification Mh in the horizontal direction H has the following significance. That is, if this relationship stands and the pixel (light modulator part) of the light modulator element (object) has a square shape, the pixel imaged on the display surface has a rectangular shape having the shorter side along the horizontal direction. Generally, it is desirable for the pixel image on the display surface to be square shaped, and this may be achieved by setting the size of the pixel of the light modulator element in the horizontal direction H to |Mh/Mv| times that in the vertical direction V. For example, in the case of the self-emitting type light modulator element such as the LED array, it is possible to increase the amount of light emission by increasing the light emitting aperture in the horizontal direction H, and to also reduce the power consumption since the applied voltage may be reduced. On the other hand, in the case of the self-non-emitting type one-dimensional light modulator element which is the reflection type, such as that proposed in the Japanese Laid-Open Patent Application No. 2002-214550, the amount of reflected light can be increased approximately at the above described ratio, to thereby enable reduction in the power (wattage) of the illumination light source.

The above described relationship |Mv/Mh|>1 may be satisfied by setting a principal point in the vertical direction V at a position closer to the light modulator element than that of a principal point in the horizontal direction H, through the entire imaging optical system. Since the position on the optical axis of the imaging optical system is the same in both the vertical and horizontal directions V and H, the position of the principal point can be controlled by varying the power arrangement in the vertical and horizontal directions V and H.

For example, in order to distribute the power arrangement in the imaging optical system, one of the vertical and horizontal directions V and H may be made a telephoto type, and the other may be made a retrofocus type. In this case, the principal point assumes a preferable position when the vertical direction V is made the retrofocus type and the horizontal direction H is made the telephoto type. The arrangement of a large positive or negative power is advantageous for the position of the principal point, but it becomes difficult to correct the wavefront aberration of a skew beam. It is preferable that the positive power is arranged on the side of the light modulator element in the vertical direction V, and that the positive power is arranged on the side of the image surface in the horizontal direction H.

The imaging optical system is desirably approximately telecentric in the vertical direction V on the side closer to the light modulator element. In the case of the general light modulator element, the directivity of the light emission is in the horizontal direction H which is perpendicular to the vertical direction V. For this reason, if greatly deviated from the telecentric, a difference between the amounts of light reaching the center image height and the peripheral image height in the vertical direction V becomes large, to thereby generate uneven brightness. In order to obtain a uniform brightness, it is effective to make the imaging optical system approximately telecentric. This may be achieved by arranging an optical element having a positive power on the side of the object in the vertical direction V, and as described above, the vertical direction may be the retrofocus type.

The stopper may be arranged closer to the imaging surface than the light modulator element, so as to provide a so-called front stopper. The stopper may be regarded as a part of the imaging optical system or a separate part from the imaging optical system. In this case, when the rotary polygon mirror or the like is arranged adjacent to the imaging optical system, the light deflecting surface in the vertical direction V can be made compact, to effectively make the image display apparatus compact. In addition, the rotational force or rotary torque required for the rotary polygon mirror is reduced, to thereby enable reduction of the load on the motor which rotates the rotary polygon mirror, reduction of the power consumption of the motor, and reduction of heat and noise generated by the motor.

Of course, the stopper may be provided inside the imaging optical system to form a so-called inner stopper. In this case, the deflecting section becomes large, but in general, it is easier in this case to correct the aberration of the imaging optical system.

The imaging optical system may include an imaging system formed by a plurality of lenses, wherein at least two of the plurality of lenses have different focal distances in the vertical and horizontal directions V and H, focal distances which differ in the vertical and horizontal directions V and H for the entire imaging optical system, and different imaging magnifications on the image surface. In this case, by selecting two lenses (or two lens groups) which are separated, it is possible to set a magnification difference without increasing the power, and obtain a high performance. A lens (or lens group) which mainly converges the light and corrects the color aberration may be provided between the two lenses (or two lens groups).

In the imaging optical system, at least one of the plurality of lenses arranged closer to the imaging surface than the light modulator element may have the power Piv in the vertical direction V and the power Pih in the horizontal direction H which satisfy the relationship Piv<Pih, and at least one of the plurality of lenses arranged closer to the light modulator element than the imaging surface may have the power Pov in the vertical direction V and the power Poh in the horizontal direction which satisfy the relationship Pov>Poh. As a result, it is possible to satisfy the above described relationships with respect to the imaging magnification and the position of the principal point.

The image display apparatus may comprise a light modulator element which has light modulator parts arranged one-dimensionally in the vertical direction V, an imaging optical system to image a one-dimensional image on an image surface by regarding the light modulator element as an object and regarding a bundle of rays from the light modulator element as an object light, where the imaging optical system includes at least two anamorphic surfaces each having radii of curvature which are different on an object surface in the vertical and horizontal directions V and H, so that imaging surfaces in the vertical and horizontal directions V and H, and a display section to display an image on a display surface by imaging the one-dimensional image on the display surface via the imaging optical system and relatively scanning the one-dimensional image and the display surface in a direction perpendicular to a longitudinal direction of the one-dimensional image. In this case, compared to the system which projects and images the area type light modulator element as in the case of the liquid crystal projector, the light modulator element can easily be fabricated at a low cost. In addition, the imaging optical system can be made small (thin), so that the image display apparatus can be made compact.

Particularly by arranging the image of the one-dimensional light modulator element so that one line is displayed in the vertical direction of the screen, the object height becomes small in the imaging optical system, and a high performance can be obtained by a compact structure due to the small angle of view. Moreover, by utilizing the different imaging magnifications in the vertical and horizontal directions V and H, it is possible to display a bright image by the image display apparatus.

In the image display apparatus, the light modulator element may comprise a first modulator element having light modulator parts with spectral characteristics for red (R) color and arranged one-dimensionally in the vertical direction V, a second modulator element having light modulator parts with spectral characteristics for green (G) color and arranged one-dimensionally in the vertical direction V, and a third modulator element having light modulator parts with spectral characteristics for blue (B) color and arranged one-dimensionally in the vertical direction V, where the first, second and third modulator elements are arranged parallel to each other so that each of the first, second and third modulator elements is adjacent to at least one of the first, second and third modulator elements. In this case, compared to the area type light modulator element, the pitch of the first through third modulator elements may be set appropriately to facilitate fabrication of the light modulator element. A color filter may be provided on the light modulator element in an on-chip manner or, a filter member may be bonded on the light modulator element, while maintaining the compact structure of the light modulator element. In addition, the first through third modulator elements of the light modulator element may be illuminated by the same illumination light source.

When the imaging optical system is basically formed by a lens system, and it is a precondition tat the color aberration occurs. For this reason, it is impossible to image the images of each of the red (R), green (G) and blue (B) colors exactly on the same image surface. As is well known, the correction of the color aberration is basically possible with respect to two colors, and the remaining one color is suppressed within the depth of the imaging. But as the density of the displayed image increases and the depth decreases, the tolerance with respect to various elements of the apparatus decreases, to thereby make the processing and assembling of the elements difficult.

In the imaging optical apparatus, a length of an imaging optical path along the optical axis for at least one of the colors may be different from those of imaging optical paths along the optical axis for the other two colors, so as to correct differences in magnifications in a direction corresponding to the vertical direction V caused by color aberration. In this case, it is possible to satisfactorily reduce the differences in the imaging positions of the red (R), green (G) and blue (B) images formed by the imaging optical system, even when the color aberration remains in the imaging optical system.

The optical path length is a product of the physical (or mechanical) length and the refractive index. Since the suitable difference $\Delta p$ in the optical path lengths (optical distance) to be set on the object side can be described by $\Delta p = \Delta L/M^2$ as described above, where $\Delta L$ denotes the difference in the imaging positions of the colors in the direction along the optical axis and M denotes the imaging magnification, a means is provided for setting the difference in the optical path lengths, that is, the difference $\Delta p$ in the distances from the surfaces of the R, G and B modulator elements having the light modulator parts to the imaging optical system along the optical axis, so that the one-dimensional images of each of the colors are imaged on the display surface. This means is provided on the object side in the case of an enlarged image, and is provided on the image side in the case of a reduced image.

If the imaging optical system is formed by a single lens, a large color aberration remains even when a material having a low dispersion (Abbe's number) is used for the single lens to reduce the color aberration of the single lens. But in the present invention, the color aberration can be effectively reduced by providing the above described means for setting the difference in the optical path lengths.

Of course, if layout restrictions permit, it is possible to form the imaging optical system solely by a mirror system so as to eliminate the color aberration. It is also possible to use an anomalous dispersion glass for the lens which forms the imaging optical system, so as to reduce the second order color aberration, but it is qualitatively the same as the above, and there is a limit to reducing the cost because the anomalous dispersion glass is expensive.

In order to minimize the peak-to-value (PV) value of the remaining color aberration of the three colors, it is possible to match the imaging surface positions for the red (R) and blue (B), but it becomes necessary to control the excessive correction of the color aberration and the correction of the other aberrations becomes difficult, thereby making it difficult to obtain a high performance. For this reason, it is desirable to substantially match the imaging surface positions of the G modulator element and the B modulator element. In this case, the correction of the error in the image surface for the R modulator element cannot be reduced considerably due to the insufficient correction, but the effects on the other aberrations is reduced.

When displaying a satisfactory color image using the light modulator elements of three colors, it is known that the contrast and sharpness of the green (G) image are important. Hence, it is desirable that the amount of light of the green (G) image is larger than those of the images of the other two colors. When the G modulator element is disposed adjacent to the optical axis of the imaging optical system, and the R and B modulator elements are disposed to sandwich the G modulator element in the horizontal direction H perpendicular to the vertical direction V, the eclipse of the light from the G modulator element by the imaging optical system is small, and a satisfactory transmittance can be achieved for the light from the G modulator element, to enable satisfactory reproduction of the color image.

Of course, the method of correcting the errors in the images of each of the colors due to the difference between the vertical magnifications caused by the color aberration is also effective when applied to the case where the imaging optical system has the color aberration.

Further, the present invention is not limited to these embodiments, but various variations and modifications may be made without departing from the scope of the present invention.

What is claimed is:

1. An optical system for an image display apparatus, comprising:
    a curvature of field correcting optical system; and
    an imaging optical system configured to pass a bundle of rays from a light modulator element including light modulator parts arranged one-dimensionally in a first direction, and configured to image a one-dimensional image on an image surface via said curvature of field correcting optical system,
    said imaging optical system comprising at least two anamorphic surfaces each having radii of curvature different in the first direction and a second direction perpendicular to the first direction on an object surface, so that imaging takes place on a single imaging surface for both the first and second directions to thereby form a two-dimensional image on the image surface.

2. The optical system as claimed in claim 1, wherein at least one of said at least two anamorphic surfaces has a bent axis toroidal surface with a non-arcuate shape within a cross section cut along the first direction, and a curvature center line of the bent axis toroidal surface formed by joining centers of curvature of cross sections cut along the second direction is a curve.

3. The optical system as claimed in claim 1, wherein at least one of said at least two anamorphic surfaces has a first non-arcuate shape within a cross section cut along the first direction, and a second non-arcuate shape within a cross section cut along the second direction, and said second non-arcuate shape is formed depending on a coordinate thereof in the first direction.

4. The optical system as claimed in claim 1, wherein an imaging magnification Mv in the first direction and an imaging magnification Mh in the second direction satisfy a relationship |Mv/Mh|>1.

5. The optical system as claimed in claim 4, wherein a principal point in the first direction is set at a position closer to the light modulator element than that of a principal point in the second direction, through the entire imaging optical system.

6. The optical system as claimed in claim 1, wherein said imaging optical system is approximately telecentric in the first direction on a side closer to the light modulator element.

7. The optical system as claimed in claim 1, further comprising:
   a stopper arranged closer to the imaging surface than the light modulator element.

8. The optical system as claimed in claim 1, wherein said imaging optical system comprises:
   an imaging system formed by a plurality of lenses, and
   at least two of the plurality of lenses have different focal distances in the first and second directions, focal distances which differ in the first and second directions for the entire imaging optical system, and different imaging magnifications on the image surface.

9. The optical system as claimed in claim 8, wherein at least one of the plurality of lenses arranged closer to the imaging surface than the light modulator element has a power Piv in the first direction and a power Pih in the second direction which satisfy a relationship Piv<Pih, and at least one of the plurality of lenses arranged closer to the light modulator element than the imaging surface has a power Pov in the first direction and a power Poh in the second direction which satisfy a relationship Pov>Poh.

10. An image display apparatus comprising:
    a light modulator element including light modulator parts arranged one-dimensionally in a first direction;
    a curvature of field correcting optical system;
    an imaging optical system configured to pass a bundle of rays from the light modulator element to image a one-dimensional image on an image surface via said curvature of field correcting optical system, said imaging optical system including at least two anamorphic surfaces each having radii of curvature different in the first direction and a second direction perpendicular to the first direction on an object surface, so that imaging takes place on a single imaging surface for both the first and second directions to thereby form a two-dimensional image on the image surface; and
    a display section configured to display an image on a display surface by imaging the one-dimensional image on the display surface via said imaging optical system and said curvature of field correcting optical system, and relatively scanning the one-dimensional image and the display surface in a direction perpendicular to a longitudinal direction of the one-dimensional image.

11. The image display apparatus as claimed in claim 10, wherein said light modulator element comprises:
    a first modulator element including light modulator parts with spectral characteristics for red color and arranged one-dimensionally in the first direction;
    a second modulator element including light modulator parts with spectral characteristics for green color and arranged one-dimensionally in the first direction; and
    a third modulator element including light modulator parts with spectral characteristics for blue color and arranged one-dimensionally in the first direction,
    said first, second and third modulator elements being arranged parallel to each other so that each of the first, second and third modulator elements is adjacent to at least one of the first, second and third modulator elements.

12. The image display apparatus as claimed in claim 11, wherein said display section overlaps the red, green and blue colors with a timing difference to perform a color composite on the same pixel imaging position when relatively scanning the one-dimensional image and the display surface.

13. The image display apparatus as claimed in claim 10, wherein said display section comprises:
    a deflecting section configured to deflect an imaged bundle of rays obtained via said imaging optical system, so as to scan the one-dimensional image with respect to the display surface which is planar; and
    said curvature of field correcting optical system, is disposed between the deflecting section and the display surface, to substantially match an image surface of the imaged bundle of rays deflected and scanned by the deflecting section to the display surface.

* * * * *